(12) United States Patent
Dotsch et al.

(10) Patent No.: US 10,665,877 B2
(45) Date of Patent: May 26, 2020

(54) REDOX FLOW BATTERY WITH EXTERNAL SUPPLY LINE AND/OR DISPOSAL LINE

(71) Applicant: Fraunhofer-Gesellschaft zur Forderung der angewandten Forschung e.V., Munich (DE)

(72) Inventors: Christian Dotsch, Oberhausen (DE); Sascha Berthold, Oberhausen (DE); Thorsten Seipp, Dortmund (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 111 days.

(21) Appl. No.: 14/368,146

(22) PCT Filed: Dec. 20, 2012

(86) PCT No.: PCT/EP2012/076453
§ 371 (c)(1),
(2) Date: Jun. 23, 2014

(87) PCT Pub. No.: WO2013/092898
PCT Pub. Date: Jun. 27, 2013

(65) Prior Publication Data
US 2014/0377688 A1    Dec. 25, 2014

(30) Foreign Application Priority Data
Dec. 23, 2011   (DE) .................. 10 2011 122 010

(51) Int. Cl.
*H01M 8/04186*   (2016.01)
*H01M 8/24*   (2016.01)
(Continued)

(52) U.S. Cl.
CPC ..... *H01M 8/04186* (2013.01); *H01M 8/0273* (2013.01); *H01M 8/04201* (2013.01);
(Continued)

(58) Field of Classification Search
CPC .......... H01M 2/40; H01M 2/025; H01M 6/04
See application file for complete search history.

(56) References Cited

U.S. PATENT DOCUMENTS

| 6,475,661 B1 * | 11/2002 | Pellegri | ......... H01M 2/40 429/105 |
|---|---|---|---|
| 6,503,650 B1 | 1/2003 | Yasuo et al. | |
| 2004/0170893 A1 | 9/2004 | Nakaishi et al. | |

FOREIGN PATENT DOCUMENTS

| AT | 510250 A1 | 2/2012 |
|---|---|---|
| DE | 1496233 A1 | 5/1969 |

(Continued)

OTHER PUBLICATIONS

Ponce-de-Leon, C., et al., "Characterization of the reaction environment in a filter-press redox flow reactor" Electrochimica Acta 52 (2007): 5815-5823.

*Primary Examiner* — Christina Chern
(74) *Attorney, Agent, or Firm* — The Webb Law Firm

(57) ABSTRACT

A redox flow battery is illustrated and described, having at least one cell frame enclosing a cell interior and having at least one supply line provided outside the cell frame for supplying electrolyte to the cell interior and/or at least one disposal line provided outside the cell frames for removing electrolyte from the cell interior. In order to provide greater degrees of freedom in the design of the cell so as to make available redox flow batteries with improved properties, it is envisaged that the supply line for supplying electrolyte to the cell interior and/or the disposal line for removing electrolyte from the cell interior is in fluid contact with the cell interior via a plurality of separate flow channels in the cell frame.

18 Claims, 6 Drawing Sheets

(51) Int. Cl.
      *H01M 8/18*         (2006.01)
      *H01M 8/0273*     (2016.01)
      *H01M 8/241*      (2016.01)
      *H01M 8/04082*    (2016.01)
      *H01M 8/04276*    (2016.01)
      *H01M 8/20*       (2006.01)

(52) U.S. Cl.
      CPC ....... *H01M 8/04276* (2013.01); *H01M 8/188* (2013.01); *H01M 8/20* (2013.01); *H01M 8/2415* (2013.01); *H01M 8/2459* (2016.02); *Y02E 60/528* (2013.01)

(56) References Cited

FOREIGN PATENT DOCUMENTS

| | | | |
|---|---|---|---|
| EP | 0051766 | A1 | 5/1982 |
| EP | 0814527 | A2 | 12/1997 |
| GB | 1097428 | A | 1/1968 |
| WO | 9939397 | A1 | 8/1999 |
| WO | 2008116248 | A1 | 10/2008 |

\* cited by examiner

REDOX FLOW BATTERY WITH EXTERNAL SUPPLY LINE AND/OR DISPOSAL LINE

CROSS-REFERENCE TO RELATED APPLICATIONS

This application is the United States national phase of International Application No. PCT/EP2012/076453 filed Dec. 20, 2012, and claims priority to German Patent Application No. 10 2011 122 010.4 filed Dec. 23, 2011, the disclosures of which are hereby incorporated in their entirety by reference.

BACKGROUND OF THE INVENTION

Field of the Invention

The present invention relates to a redox flow battery with at least one cell frame surrounding a cell interior and with at least one supply line provided outside the cell frame for supplying electrolyte to the cell interior and/or at least one disposal line provided outside the cell frame for removing electrolyte from the cell interior. The invention also relates to a method for operating a redox flow battery.

Description of Related Art

Redox flow batteries are already known in various implementations. Such implementations are described for example in EP 0 051 766 A1 and U.S. 2004/0170893 A1. An important advantage of redox flow batteries lies in their ability to be able to store very large amounts of electrical energy. The energy is in this connection stored in electrolytes that can be held ready for use in a space-saving manner in very large tanks. The electrolytes generally comprise metallic ions in different oxidation states. In order to draw electrical energy from the electrolytes or to recharge the latter, the electrolytes are pumped by means of a so-called electrochemical cell.

The electrochemical cell is in this connection formed from two half cells that are separated from one another by a separator, for example in the form of a semi-permeable membrane, and respectively contain an electrolyte and an electrode. The task of the separator is to separate the cathode and anode of an electrochemical cell spatially and electrically from one another, and it must therefore be permeable to ions that carry out the conversion of the stored chemical energy into electrical energy. Separators can for example be formed from microporous plastics and also non-woven materials of glass fibres or polyethylene and so-called diaphragms or semi-permeable membranes. Redox reactions take place at both electrodes of the electrochemical cell, electrons being released by the electrolytes at one electrode and accepted at the other electrode. The metallic and/or non-metallic ions of the electrolyte form redox pairs and consequently generate a redox potential. Iron-chromium, polysulphide-bromide or vanadium for example may be mentioned as redox pairs. These or also other redox pairs may in principle exist in aqueous or non-aqueous solutions.

The electrodes of a cell between which a potential difference is generated as a result of the redox potentials are electrically connected to one another outside the cell, for example via an electrical consumer. While the electrons outside the cell pass from one half cell to the other, ions of the electrolytes pass through the separator directly from one half cell to the other half cell. To recharge the redox flow battery, instead of the electrical consumer a potential difference can be applied at the electrodes of the half cells, for example by means of a charging device, through which the redox reactions taking place at the electrodes of the half cells are reversed.

Cell frames that enclose a cell interior are used to form the described cell. Each half cell thus includes such a cell frame, which are generally produced from a thermoplastic material by an injection moulding process.

A separator is arranged between two cell frames, which is typically a membrane or a diaphragm and which separates the electrolytes of the half cells from one another in relation to a convective mass transfer, but allows a diffusion of certain ions from one half cell to the other half cell. In addition an electrode is respectively associated with the cell interiors so that these are in contact with the electrolytes flowing through the cell interiors. The electrodes may for example seal off the cell interior of each cell frame on the side facing away from the separator. Each cell frame has openings and channels through which the corresponding electrolyte can flow from a supply line to the respective cell interior from where it can be removed again and also fed to a disposal line. The electrolytes of the half cells are in this connection pumped via the supply line and the disposal line from a receiver container to a collecting container. This enables the electrolytes to be reused, which consequently do not have to be discarded or replaced.

If the redox flow battery contains only a single cell, then a supply line for each half cell and a disposal line for each half cell are arranged outside the cell frames forming the half cells. Each cell frame has for this purpose two openings, one of which is connected to a supply line while the other opening is connected to the disposal line. Within the cell frame or the cell jacket each opening is connected to a flow channel, which is open to the cell interior. This enables electrolyte to be fed from the supply line to the cell interior and the electrolyte that has flowed through the cell interior to be removed via the disposal line. In order to distribute the electrolyte more uniformly over the width of the cell interior and remove the electrolyte more uniformly over the width of the cell interior, the respective flow channel between the outer opening and the cell interior, in other words in the region of the frame jacket of the cell frame, can be branched one or more times.

If necessary a plurality of similar cells are assembled in a redox flow battery. Generally for this purpose the cells are stacked on top of one another, which is why the totality of the cells is also termed a cell pile or cell stack. The electrolytes generally flow in parallel to one another through the individual cells, whereas the cells are generally electrically connected in series. The cells are therefore generally connected hydraulically in parallel and electrically in series. In this case the charge state of the electrolytes in respectively one of the half cells of the cell stack is the same.

In order to distribute the electrolytes to the corresponding half cells of the cell stack and for the joint removal of the electrolytes from the respective half cells, the half cells are connected to one another by supply and disposal lines. Since another electrolyte flows through each half cell and each cell interior of a cell, the two electrolytes have to be separated from one another during their passage through the cell stack. Accordingly two separate supply lines and two separate disposal lines are as a rule provided along the cell stack. Each of these channels is as a rule partly formed by the cell frames themselves, which have four bores for this purpose. The bores extend along the cell stack and form the supply and disposal lines arranged behind one another and if necessary separated from one another by sealing materials.

In each half cell flow channels branch off respectively from a supply line and respectively from a disposal line, which channels are connected to the cell interior and thus allow the supply and removal of electrolytes to the half cells and enable electrolytes to flow through the cell interiors. In the case of larger half cells with larger cell interiors these flow channels branch on the one hand between the supply line and the cell interiors, and on the other hand between the disposal lines and the cells interiors, in order to achieve a uniform flow of electrolyte through the cell interiors and avoid regions through with little electrolyte flow and also short-circuit currents. In order to be able to incorporate these branching also into the cell frames, the frame jackets of the cell frames enclosing the cell interior must be designed relatively wide. This however means that the frame jackets have large lateral frame surfaces, which act outwardly as sealing surfaces for sealing the cell stack and for this purpose are pressed against one another or against sealing materials provided between them.

In order to avoid electrical short-circuit currents the flow channels must have a sufficient length, so that the frame jackets of the cell frames have to be designed sufficiently wide, which can lead to a further enlargement of the frame surface to be sealed. This applies especially if the flow channels, as is usually the case with injection-moulded cells frames, are sunk as open grooves in the outside of the frame jackets of the cell frames and are sealed by sealing materials, electrodes or the like only when the sell stack is assembled. It is also a disadvantage that the cross-sectional area of the supply lines and of the disposal lines increases with increasing size of the cell stack and with increasing number of cells, so as to be able to transport electrolyte satisfactorily through the cells. This too can lead to wider frame jackets of the cells frames.

In this connection it is important that the sealing surfaces the cell frames have to be pressed more firmly against one another with a constant surface pressure on the sealing surfaces the larger the sealing surfaces. In practice however there are always leakages despite careful design of the redox flow batteries, which is why a number of limiting boundary conditions have to be observed when designing the cell frames.

SUMMARY OF THE INVENTION

Against this background the object of the present invention is to configure and modify the redox flow battery and also its mode of operation mentioned in the introduction and described in more detail hereinbefore so that greater degrees of freedom are available as regards the cell design, in order to provide as far as possible redox flow batteries having improved properties.

This object may be achieved with a redox flow battery according to a non-limiting embodiment of this present invention, in which the supply line for supplying electrolyte to the cell interior and/or the disposal line for removing electrolyte from the cell interior is in fluid contact with the cell interior via a plurality of separate flow channels in the cell frame.

In addition the aforementioned object is achieved by a method of the aforementioned type, in which an electrolyte is supplied via a plurality of separate flow channels provided in the cell frame to at least one cell interior enclosed by a cell frame, and/or an electrolyte is removed via a plurality of separate flow channels provided in the cell frame from at least one cell interior enclosed by a cell frame.

A plurality of separate flow channels provided in the cell frame is understood here to mean those channels that are preferably not connected to one another within the frame jacket of the cell frame. Flow channels are not separate if the flow channels branch from a common starting point and otherwise run separately from one another. In this connection separate flow channels can branch if necessary. The separate flow channels can in addition also be continued separately from one another outside the corresponding cell frame, i.e. can go off separately from one another from a supply line and/or terminate separately from one another in a disposal line.

It is understood that not all flow channels in the frame jacket of the cell frame have to be unconnected from one another, so long as at least a plurality of separate flow channels is provided, which are allocated to the supply line and/or to the disposal line. A mixture of if necessary branched flow channels connected to one another and separate flow channels may thus be provided in the region of the frame jacket and allocated to the supply line and/or to the disposal line.

The invention has recognised that the distribution of the electrolyte to be supplied to a cell interior can take place in a region outside the corresponding cell frame. The electrolyte can then be supplied through the plurality of separate flow channels to the cell interior in a uniformly distributed manner over its width. Alternatively or in addition the electrolyte can be removed in a uniformly distributed manner from a cell interior over its width if a plurality of separate flow channels is provided for this purpose and the supply of the electrolyte to be removed takes place only outside the cell frame.

In such a configuration of a redox flow battery simply separate through passages or bores for the separate flow channels have to be provided in the cell frame between the cell interior on the one hand and the supply line and/or the disposal line on the other hand. A branching of the flow channels in the region of the frame jacket of the cell frame is unnecessary for the distribution of the electrolyte over the width of the cell interior and/or for collecting the electrolyte removed over the width of the cell interior.

As a result the cell frame can on the one hand be designed very simply and thus cost-effectively and also on the other hand with a very narrow edge, i.e. with a narrow frame jacket encompassing the cell interior. The latter feature means that only a very narrow or small frame surface area has to be made available, which serves as sealing surface for sealing the redox flow battery against an undesired leakage of electrolyte. Consequently cell stacks with a very large number of cells can be provided, without any danger of leakages. If necessary the cell frames can be sealed with ring seals, for example of the O-ring seal type.

A particular advantage of the invention also lies in the fact that large cell frames with cell interiors of very large area can be provided. By means of a sufficient number of separate flow channels, which preferably can be arranged distributed uniformly over the width of the cell interior, then on the one hand the distribution of the electrolyte can also take place over a large width of a cell interior outside the cell frame, and on the other hand the collection of the electrolyte removed separately over a large width of the cell interior can take place outside the cell frame. Thus for example simply a sufficient number of through passages to the cell interior has to be provided in the cell frame, which are connected to the supply line and/or to the disposal line.

In this connection a simple matching of the redox flow battery to variously large cell frames and cell interiors can take place, in which the number of separate flow channels is adapted to the width of the respective cell interiors. If in this connection the flow cross-sectional areas of the supply line and/or of the disposal line are always chosen to be sufficiently large compared to the flow cross-section areas of the separate flow channels, then in addition a supply and/or removal of electrolyte in a manner distributed uniformly over the width of the cell interior can always be ensured.

The attachment of the separate flow channels provided in the cell frame to the supply line and/or to the disposal line can be implemented in various ways. Thus, the supply line and/or the disposal line can directly adjoin the cell frames. The outer openings of the separate flow channels in the cell frame or frame jacket are then directly connected to the supply line and/or the disposal line. Preferably the cell frame forms part of the wall of the supply line and/or of the disposal line. The supply line and/or the disposal line can however also be arranged spaced from the cell frame. The cell frame is then connected by means of lines or the like to the supply line and/or the disposal line. The number of lines in this case then preferably coincides with the number of separate flow channels. In other words, each separate flow channel can be connected via a line section outside the cell frame to the supply line and/or to the disposal line.

In a first preferred configuration of the redox flow battery the cell interior is in fluid contact via at least 10, preferably at least 20, in particular at least 30, separate flow channels provided in the cell frame, with the supply line for feeding electrolyte to the cell interior and/or with the disposal line for removing electrolyte from the cell interior. Due to the large number of separate flow channels, which can even be 50 or more, the electrolyte can be uniformly distributed over a wide cell interior. Alternatively or in addition the electrolyte can, after flowing through the cell interior, be removed uniformly from the cell interior via the plurality of separate flow channels, and specifically also if the cell interior is very wide. This additionally provides the possibility of also using very large cell frames with cell interiors of very large surface areas in redox flow batteries.

So that on the one hand the cell frames can be formed relatively flat and at the same time a sufficient volume flow of electrolyte can be passed through the cells, the plurality of separate flow channels in the cell frame for supplying electrolyte to the cell interior and/or for removing electrolyte from the cell interior can respectively have a hydraulic internal diameter of between 20 mm and 0.5 mm, preferably between 10 mm and 1 mm.

In order to achieve as uniform a flow as possible through the cell interior of the cell frame, the flow channels between the cell interior and the supply line and also the flow channels between the cell interior and the disposal line can be provided on different sides of the cell frame and/or of the frame jacket referred to the cell interior. The electrolyte is then supplied at one side of the cell frame to the cell interior and is removed from the cell interior at the opposite side of the cell frame.

In order to maintain the frame surface area of the cell frame or of the frame jacket that is to be sealed as low as possible, it is preferred if the separate flow channels for supplying the cell interior with electrolyte and/or the separate flow channels for removing electrolyte from the cell interior are provided substantially unbranched in the cell frame, preferably in the frame jacket of the latter.

Also, with a plurality of separate flow channels a uniform flow through the flow channels over the width of the cell frame or of the cell interior can be ensured if the cross-sectional surface area of the supply line and/or the cross-sectional surface of the disposal line is greater at least by a factor of 10, preferably 50, in particular 100, than the cross-sectional surface area of each flow channel of the plurality of separate flow channels between the cell interior on the one hand and the supply line and/or the disposal line on the other hand.

In order to obtain the advantages described hereinbefore for a half cell or for a cell frame in relation to both half cells of a cell of the redox flow battery, at least one cell can be provided with two half cells, wherein each half cell has a cell frame enclosing a cell interior and at least one supply line provided outside the cell frame for supplying electrolyte to the cell interiors. The at least one supply for supplying electrolyte to the cell interiors can then respectively be in fluid contact with the cell interiors via a plurality of separate flow channels provided in the cell frame. Thus, both cell frames of a cell are supplied with electrolyte via respectively a plurality of separate flow channels provided in the cell frame. In this connection preferably another supply line is allocated to each half cell or each cell frame of the cell, so as to be able to supply both half cells with different electrolytes. In the case of a cell stack several, preferably all, cells of the cell stack can be designed in this way.

Alternatively or in addition, in order to achieve the advantages for the half cell described hereinbefore for both half cells of a cell, at least one such cell can be provided with two half cells, wherein each half cell has a cell frame enclosing a cell interior and at least one disposal line provided outside the cell frame for removing electrolyte from the cell interiors. The at least one disposal line for removing electrolyte from the cell interiors can then be in fluid contact with the cell interiors respectively via a plurality of separate flow channels provided in the cell frame. The electrolyte is then removed from each cell interior of the two half cells respectively via a plurality of separate flow channels provided in the cell frame. In this connection the two cell interiors of the two half cells are preferably in fluid contact with respectively another disposal line, so that the two electrolytes with which the cell is operated are not mixed. In the case of a cell stack several, preferably all, cells of the cell stack can be designed in this way.

It may be particularly preferred if a plurality of cells is provided, which if necessary are combined to form a cell stack, which respectively have at least one cell frame enclosing a cell interior, wherein at least one supply line arranged outside the cell frames for supplying electrolyte to the respective cell interiors is allocated to the cells. In this connection the at least one supply line for supplying electrolyte to the cell interiors can be in fluid contact with the cell interiors via respectively a plurality of separate flow channels provided in the respective cell frame. A plurality of cells can thus be provided, of which respectively at least one cell interior is supplied via a supply line with electrolyte via a plurality of separate flow channels in the respective cell frame. If in this connection respectively the cell interiors of similar half cells are involved, then in principle a single supply line may be sufficient if the similar half cells are supplied parallel to one another with the same electrolyte. From the structural point of view however several supply lines may also be provided. If the cell interiors supplied by a plurality of separate flow channels do not involve such similar half cells, then in order to use different electrolytes for different half cells it is preferred if at least two different supply lines are provided, in which each of the two supply lines is allocated to similar half cells.

Alternatively or in addition a plurality of cells may similarly be provided, which respectively comprise a cell frame enclosing a cell interior, wherein at least one disposal line arranged outside the cell frame for removing electrolyte from the cell interiors is allocated to the cells. In this connection the at least one disposal line for removing electrolyte from the cell interiors can be in fluid contact with the cell interiors respectively via a plurality of separate flow channels provided in the respective cell frames. A plurality of cells can thus be provided, wherein electrolyte flowing through the cell interior is removed from respectively at least one cell interior of each cell via a plurality of separate flow channels in the respective cell frames. If in this connection these are respectively the cell interiors of similar half cells, then in principle a single disposal line may be sufficient if for example the same half cells are supplied parallel to one another with the same electrolyte. From a structural aspect a plurality of disposal lines may however also be provided. If the cell interiors from which electrolyte is respectively removed via a plurality of flow channels are not those of similar half cells, then in order to use different electrolytes for different half cells it is preferred if at least two different disposal lines are provided, wherein each of the two disposal lines is allocated to similar half cells.

In order to be able to match the performance and the properties of the redox flow battery to the respective requirements, the plurality of cells can be assembled to form a cell stack, for which purpose the cells can preferably be stacked on top of one another.

It can be ensured in a structurally simple manner that the separate flow channels provided in the at least one cell frame are fluid-tight if the plurality of separate flow channels of the at least one cell frame for supplying electrolyte to the respective cell interior are respectively enclosed over their whole circumference by the cell frame. Alternatively or in addition the plurality of separate flow channels of the at least one cell frame for removing electrolyte from the respective cell interior can also be enclosed over their whole circumference by the cell frame. The flow channels are then not formed as open channels or grooves at a lateral outside region of the cell frame, which are closed only by abutment against an adjoining structural part. The flow channels are instead enclosed along the flow path by the respective cell frame itself, the walls of the flow channels preferably being formed substantially exclusively by the cell frame. This can be achieved for example if the separate flow channels are formed by separate bores through the frame jacket of the cell frame or the like.

As already follows from the described, preferred structural configuration of the redox flow battery, the invention is also not restricted as regards method to the supply and/or removal of electrolyte to a cell interior and/or from a cell interior of a cell or to the case of a cell stack of similar cells. Rather, it is preferred if the electrolyte is supplied respectively via a plurality of separate flow channels to a plurality of cell interiors of a cell and/or of a cell stack enclosed by cell frames, and/or the electrolyte is removed respectively via a plurality of separate flow channels from a plurality of cell interiors of a cell and/or a cell stack enclosed by cell frames. The plurality of separate flow channels is then also provided in the respective cell frame.

In principle it is preferred in this connection if the whole cell stack of the redox flow battery is uniformly constructed. Preferably the cell stack is of a modular construction, the structural components of different cells being similar to one another or even identical to one another. This reduces the structural and apparatus complexity and expenditure.

Alternatively or in addition it is preferred if all cells of a cell stack are operated similarly or indeed identically to one another. This simplifies the implementation of the method.

A similar construction and similar operation of the cell stack are however not absolutely necessary. Thus, use can then still be made of the teaching according to the invention even if only some cells of the cell stack are constructed in the afore-described manner and/or are operated in the afore-described manner.

For example, individual cell frames or cells can be provided that do not have a plurality of separate flow channels for supplying the cell interior with electrolyte and/or for removing the electrolyte from the interior. This is however in principle less preferred for the afore-mentioned reasons.

BRIEF DESCRIPTION OF THE DRAWINGS

The invention is described in more detail hereinafter with the aid of drawings simply illustrating exemplary embodiments. In the drawings.

DETAILED DESCRIPTION OF THE INVENTION

Figure 1A:
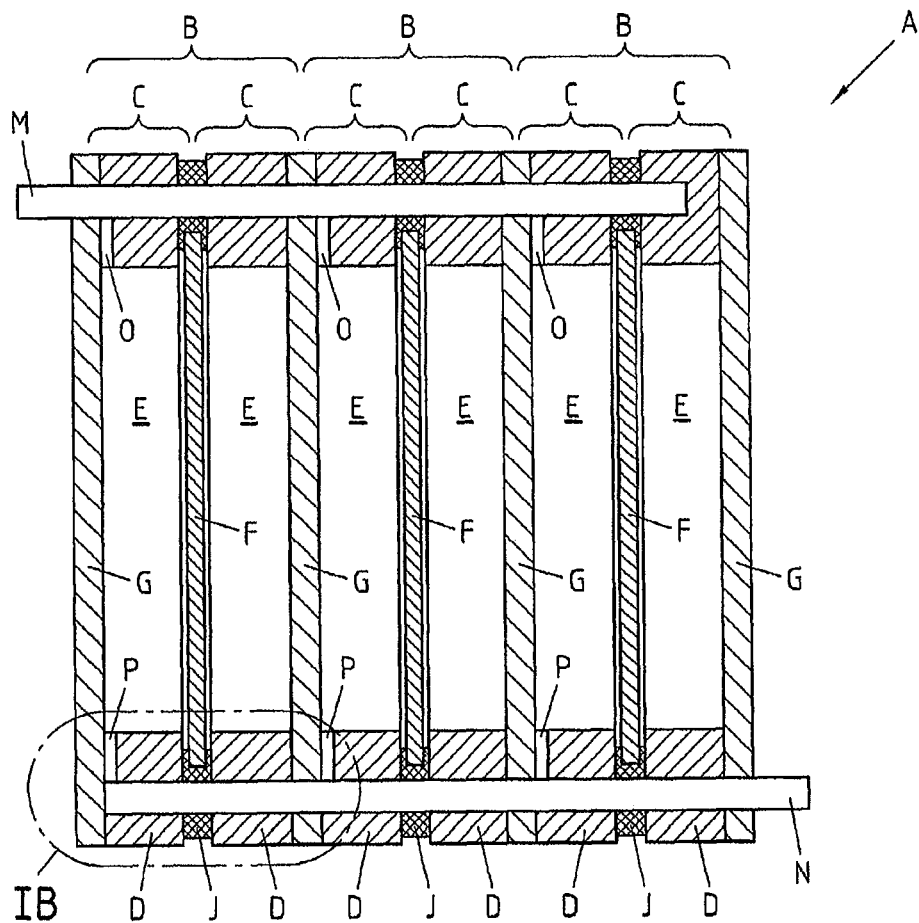
FIGS. 1A and 1B show a longitudinal section of a cell stack of a redox flow battery known from the prior art.
Figure 1B:
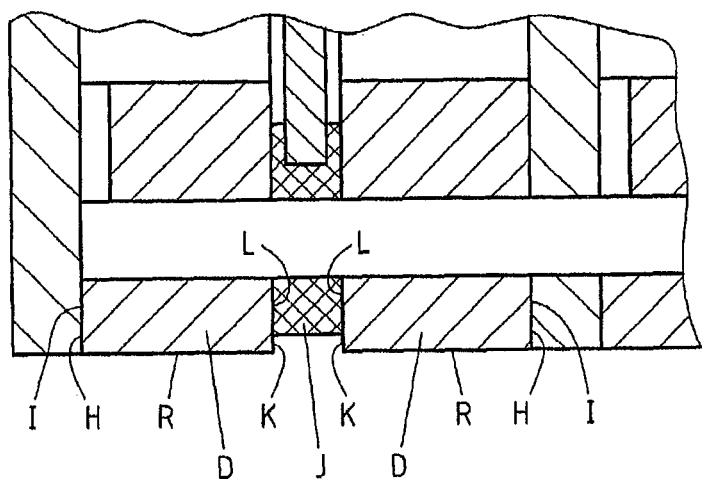

A cell stack A, i.e. a cell stack of a redox flow battery known from the prior art and described in more detail in the introduction, is illustrated in longitudinal section in FIGS. 1A and 1B. The cell stack A comprises three cells B, which respectively have two half cells C with corresponding electrolytes. Each half cell C has a cell frame D, which encloses a cell interior E through which can be fed an electrolyte stored in a receiver vessel.

The cell interior E is closed adjoining the cell frame D of the second half cell C by a semi-permeable membrane F provided between the cell frame D of the two half cells C. A convective flow of the two different electrolytes of the two half cells C in to the cell interior E of the cell frame D of the other half cell C is thus prevented. However, ions can pass by diffusion from one electrolyte to the other electrolyte through the semi-permeable membrane F, whereby a charge transport takes place. Due to redox reactions of the redox pairs of the electrolytes at the electrodes G of the half cells C of a cell B, electrons are either released or accepted. The released electrons can flow via an electrical connection provided outside the redox flow battery, if necessary comprising an electrical consumer, from one electrode G to the other electrode G of a cell B. At which electrode G reactions take place depends on whether the redox flow battery is being charged of discharged.

The electrodes G also close the cell interiors E adjoining the next cell B. In the illustrated cell stack A the electrode G lies flat on an outside surface H of the cell frame D. The electrode G thus forms in the abutment region with the outside H of the cell frame D a frame surface that acts as a sealing surface I. A sealing material J, in which the membrane F is accommodated in a sealing manner, is disposed between the outside surfaces H facing towards one another of the cell frames D of a cell B. The sealing material J lies over the surface on the outsides K of the adjoining cell frames D and thus forms frame surfaces that act as sealing surfaces L.

In the illustrated redox flow battery four channels extend along the cell stack A. Two of these are supply lines M for supplying the two electrolytes. The other two channels are disposal lines N for removing the electrolytes. FIG. 1A shows respectively a supply line M and a disposal line N. From the disposal line M branch flow channels O in respectively one half cell C of each cell B, through which the electrolyte can be supplied to the corresponding cell interior E of the half cell C. Flow channels P are provided on oppositely facing sections of the corresponding cell frames D, through which the electrolyte can be drained from the cell interiors E into the disposal line N. The supply line M, not illustrated in FIG. 1A, and the disposal line N, likewise not illustrated in FIG. 1A, enable the second electrode to flow via similar flow channels O, P through the respective other cell interiors E of the other half cells C.

Figure 2:
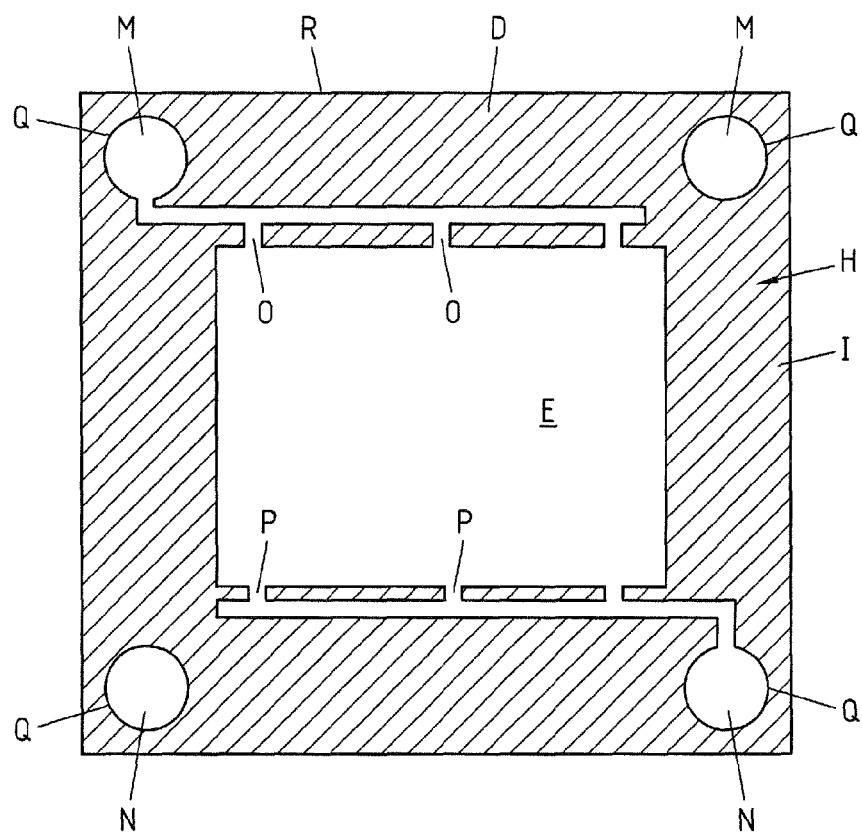
FIG. 2 is a plan view of a cell frame of the cell stack of FIG. 1.

A plan view a cell frame D is illustrated in FIG. 2. Four bores Q are provided in the corners of the cell frame D, each bore forming part of a supply line M or a disposal line N. The flow channels O, P are sunk as depressions in the illustrated outside H of the frame jacket R of the cell frame D surrounding the cell interior E. The flow channels O, P have branchings between one another and are respectively connected to a bore Q. The flow channels O, P are therefore all connected to one another in the cell frame D. Consequently separate flow channels are not allocated either to the supply line M or to the disposal line N.

Figure 3:
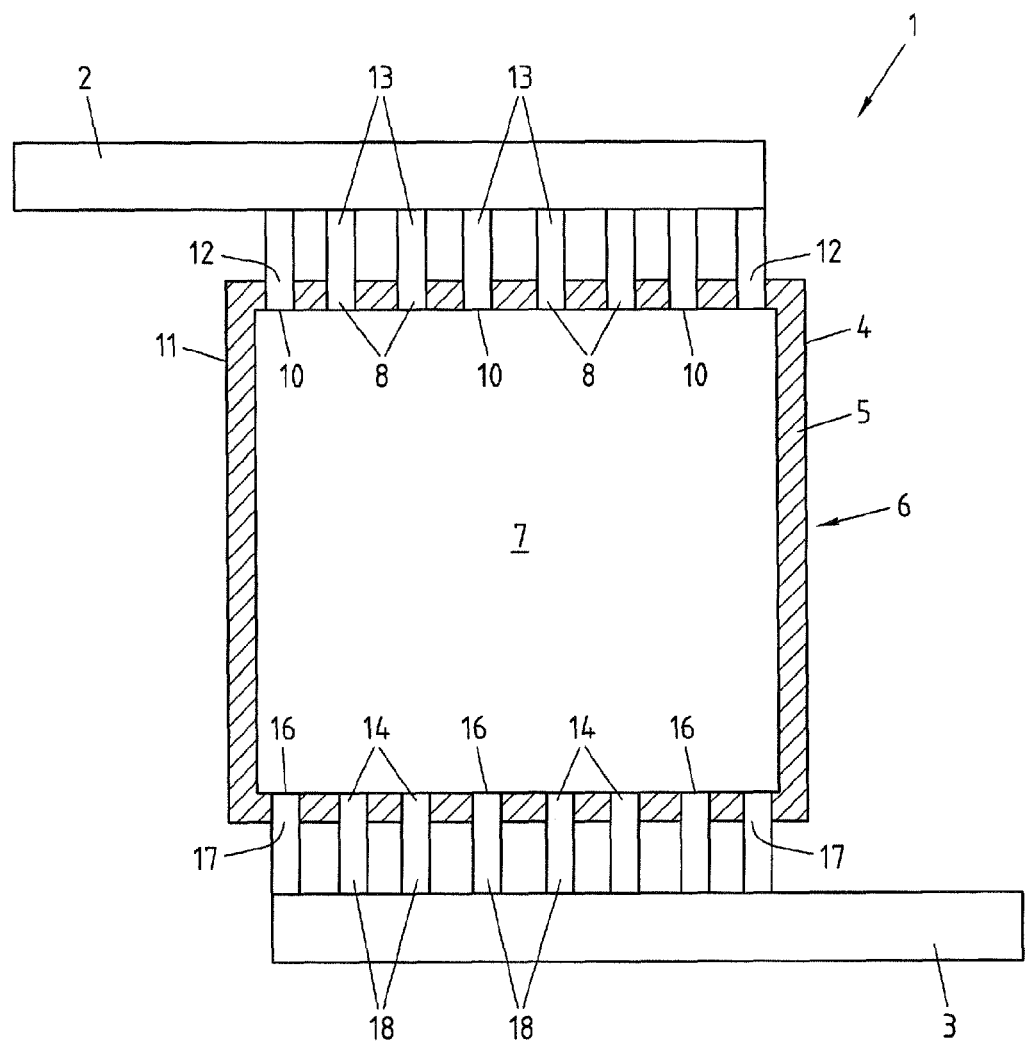
FIG. 3 is a cross-sectional view of a first configuration of a redox flow battery according to the invention.

FIG. 3 shows a cross-section through a redox flow battery 1, whose operating principle is substantially the same as the redox flow battery illustrated in FIGS. 1 and 2, in which however the supply line 2 and the disposal line 3 of each cell frame 4 outside the respective cell frame 4 is arranged differently than in the case of the redox flow battery illustrated in FIGS. 1 and 2. The cross-section of the supply line 2 and of the disposal line 3 therefore do not have to be sealed by the frame surfaces of the outsides 6 of the cell frames 4 acting as sealing surfaces 5. The frame surface or sealing surface 5 of the cell frames 4 can accordingly be designed small compared to the cell interior 7 enclosed by the cell frame 4.

The supply of the electrolyte via the cell frames 4 to the cell interior 7 takes place via separate flow channels 8 sunk in the cell frames 4, which run parallel to one another and are distributed uniformly over the width of the cell interior 7. The flow channels 8 have openings 10 on the side of the cell frame 4 facing towards the cell interior 7, through which the electrolyte can be uniformly distributed over the width of the cell interior 7. Also the flow channels 8 on the outer edge of the cell frame 4, i.e. on the outside of the provided frame jacket 11 surrounding the cell interior 7, form openings 12 that are connected separately via thin lines 13 to the common supply line 2. An electrolyte can thus be supplied to the cell interior 7 via the supply line 2, the thin lines 13 and the parallel and separate flow channels 8 in the cell frame 4.

On the oppositely facing frame side of the cell frame 4 and on the oppositely facing side of the frame jacket 11 are provided flow channels 14 that are also parallel and separate, and which are open via corresponding openings 16, 17 to the cell interior 7 and to the edge of the cell frame 4, i.e. to the outside of the frame jacket 11. The separate flow channels 14 are aligned parallel to one another, and are arranged distributed uniformly over the width of the cell interior 7. These flow channels 14 are provided in order to drain the electrolyte from the cell interior 7 via the cell frame 4 to the disposal line 3, for which purpose the separate flow channels are connected via thin lines 18 to a common disposal line 3.

Figure 4:
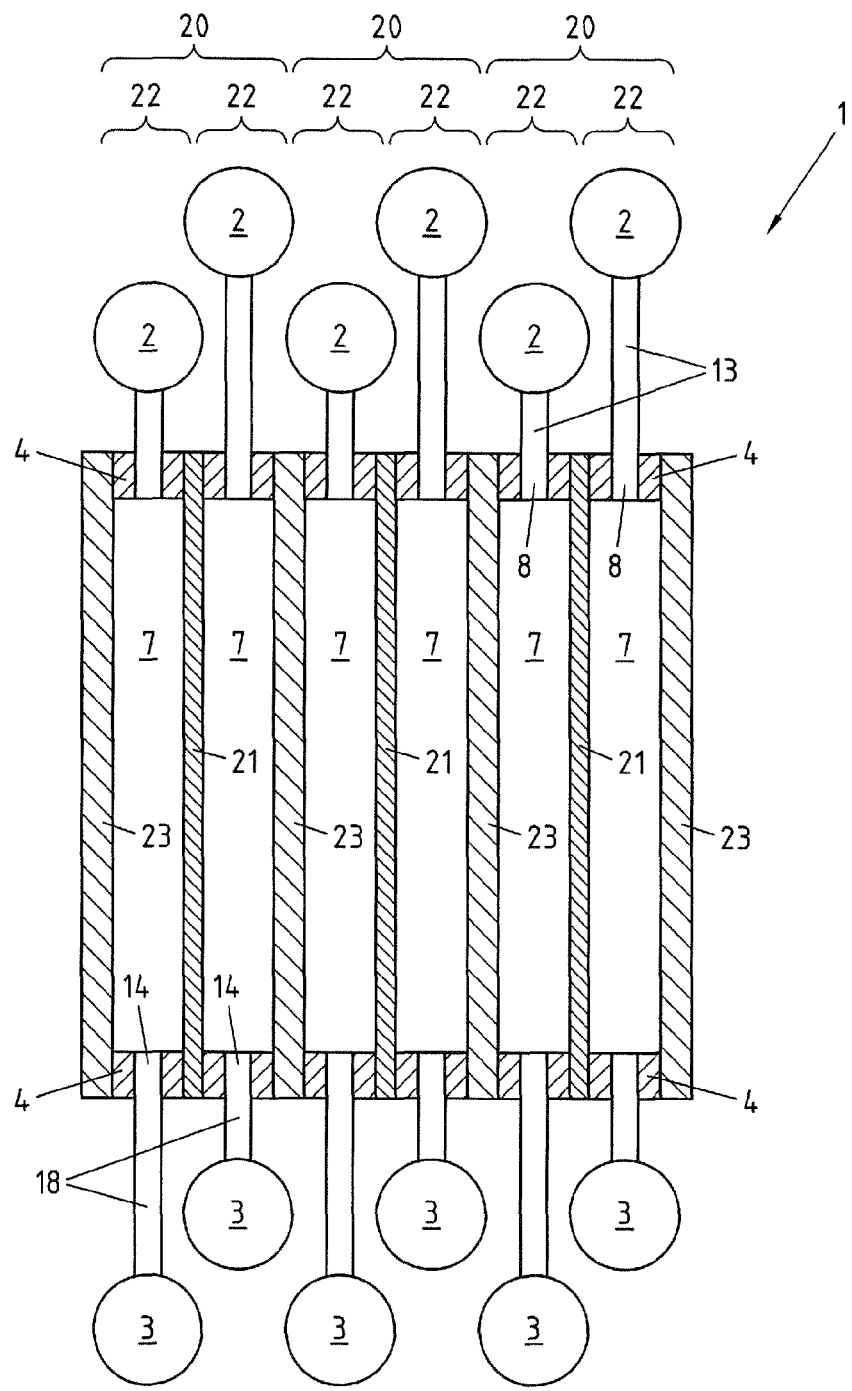
FIG. 4 is a longitudinal section of the redox flow battery of FIG. 3.

The redox flow battery 1 from FIG. 3 is illustrated in a longitudinal section in FIG. 4. The cells 20 are in this connection composed of similar structural parts, which therefore bear the same reference numerals. The separators are formed as semi-permeable membranes 21 and are provided between the cell frames 4 of the half cells 22 belonging to one another, which are pressed together and thus outwardly seal the membranes 21.

Between the cells 20 there is respectively provided an electrode 23, which outwardly closes off the cell interior 7 from at least one cell frame 4. In the illustrated and to this extent preferred redox flow battery 1 each half cell 22 and each cell frame 4 has a connection to a supply line 2 and a disposal line 3. The supply lines 2 for a same electrolyte can be connected to one another just like the disposal lines 3 for a same electrolyte. The supply line 2 and a disposal line 3 can however also be connected separately to at least one receiver container.

Figure 5:
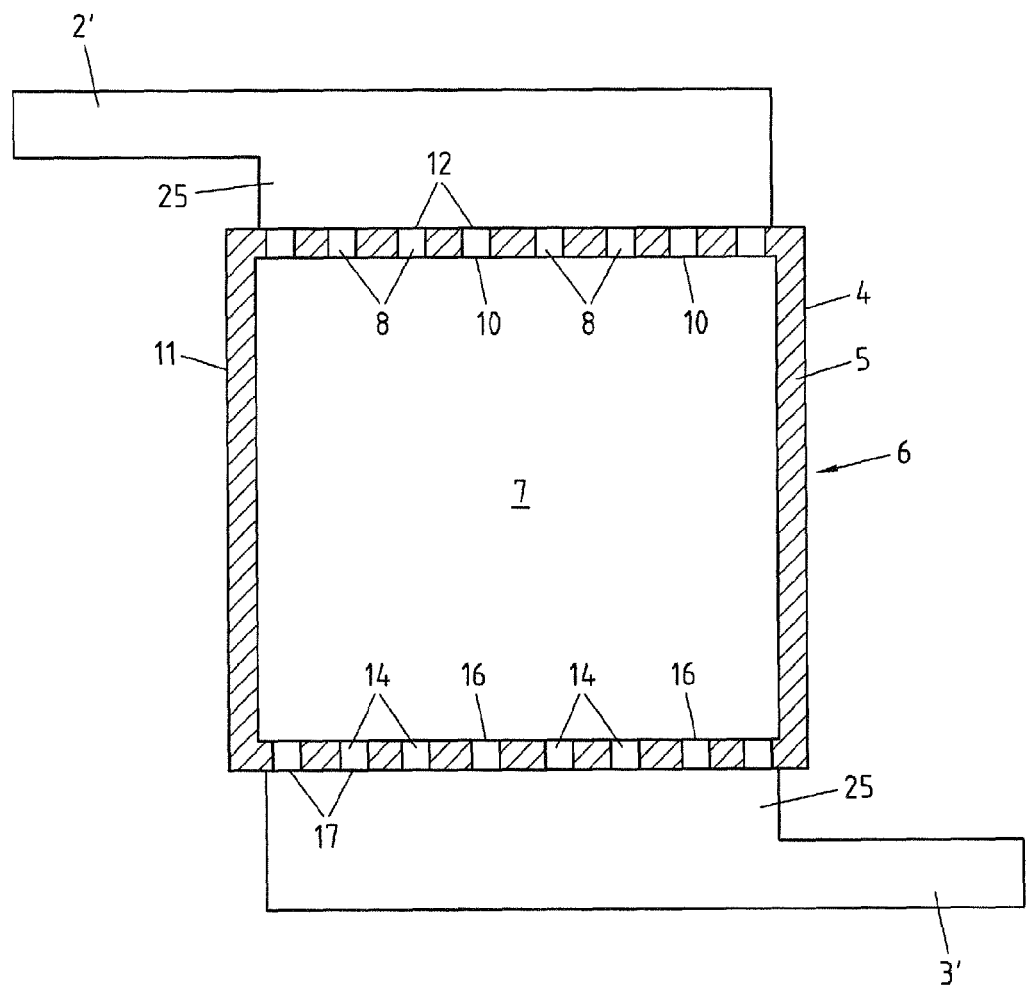
FIG. 5 is a transverse section of a second configuration of a redox flow battery according to the invention.

The redox flow battery 1' illustrated in cross-section in FIG. 5 has the same functional structure as the redox flow battery 1 illustrated in FIGS. 3 and 4, though in this case the thin connection lines between the cell frame 4 on the one hand and the supply line 2' and disposal line 3' on the other hand are dispensed with. Instead the supply line 2' and the disposal line 3' on the side facing towards the cell frame 4 have a longitudinal, gap-shaped section 25 of reduced cross-section compared to the adjoining region of the supply line 2' and the disposal line 3'. These gap-shaped sections 25 connect a series of separate flow channels 8, 14. The corresponding flow channels 8, 14 are respectively fully sunk in the cell frames 4. A separate sealing of the flow channels 8, 14 over the outsides of the cell frame 4 facing towards the adjoining cells is therefore unnecessary.

The gap-shaped section 25 of the supply line 2' and disposal line 3' are connected via openings 12, 17 in the frame jacket 11 of the cell frame 4 to the flow channels 8, 14 of the electrolyte supply 8, 14. The flow channels 8, 14 are open via further openings 10, 16 to the cell interior 7.

Figure 6:
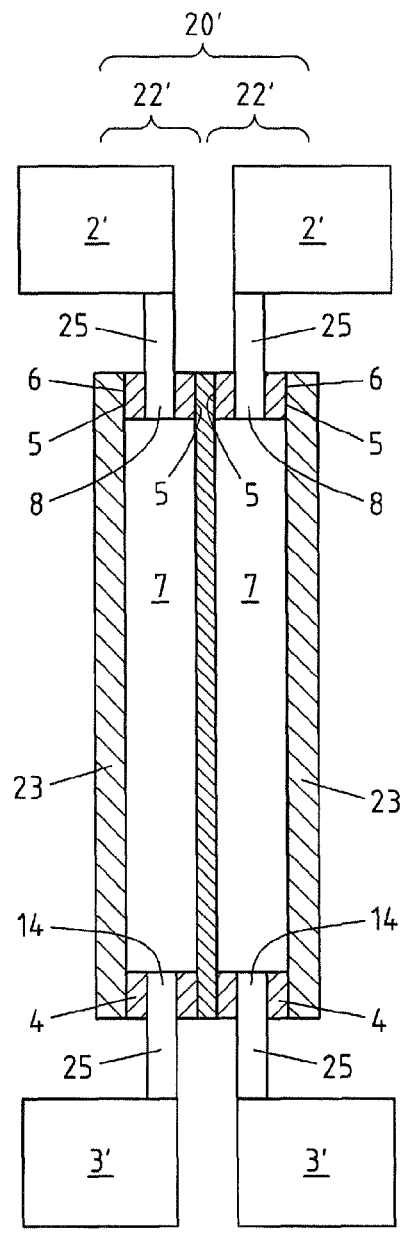
FIG. 6 is a section of a cell of the redox flow battery of FIG. 5 perpendicular to the plane of the cell.

An electrochemical cell 20' formed using cell frames 4, as are illustrated in FIG. 5, is shown in FIG. 6. A plurality of these 20' can be stacked on top of one another to form a cell stack, and specifically according to the basic principle as illustrated in FIG. 4.

The two half cells 22' of the cell 20' comprise respectively a cell frame 4, which surrounds a cell interior 7, through which an electrolyte can be pumped. The cell interiors 7 of the cell frames 4 are separated by separators in the form of a membrane 21, which is permeable to certain ions. The outsides 6 of the cell frames 4 facing away the membrane 21 are closed by means of electrodes 23. In the illustrated and to this extent preferred redox flow battery the electrodes are formed as graphite electrodes. Another electrolyte is supplied to each half cell 22' via the supply lines 2' and the separate flow channels 8 in the cells frame 4 and is removed via separate flow channels 14 and the disposal lines 3'.

The electrodes 23, the cell frames 4 and the membrane 21 are pressed together with such a surface pressure that the cell 20' is liquid-tight and the electrolytes cannot undesirably leak.

The invention claimed is:

1. A redox flow battery comprising:
a plurality of cells, wherein each cell comprises two half-cells, wherein each half-cell comprises a cell frame defining a half-cell interior,
a supply line positioned outside each of the cell frames of the half-cells to supply electrolyte to the redox flow battery,
a disposal line positioned outside each of the cell frames of the half-cells to remove electrolyte from the redox flow battery,
wherein each half-cell is provided with a plurality of separate supply channels extending through the cell frame to supply electrolyte to the half-cell interior of the half-cell from the corresponding supply line,
wherein each of the supply channels of the half-cells are unconnected to one another inside of the cell frames;
each half-cell being further provided with a plurality of separate disposal channels extending through the cell frame to remove electrolyte from the half-cell interior of the half-cell to the corresponding disposal line,
wherein each of the disposal channels of the half-cells are unconnected to one another inside of the cell frames.

2. The redox flow battery according to claim 1, wherein the redox flow battery comprises at least 10 supply channels.

3. The redox flow battery according to claim 1, wherein the redox flow battery comprises at least 20 supply channels.

4. The redox flow battery according to claim 1, wherein the redox flow battery comprises at least 30 supply channels.

5. The redox flow battery according to claim 1, wherein at least one of the supply channels has a hydraulic internal diameter of between 0.5 mm and 20 mm.

6. The redox flow battery according to claim 1, wherein at least one of the supply channels has a hydraulic internal diameter of between 1 mm and 10 mm.

7. The redox flow battery according to claim 1, wherein corresponding supply channels and disposal channels are provided on different sides of the half-cell.

8. The redox flow battery according to claim 1, wherein at least a portion of the supply channels are at least substantially non-branched inside of the cell frame.

9. The redox flow battery according to claim 1, wherein the cross-sectional surface area of the supply line is greater at least by a factor of 10 than a cross-sectional surface area of each of the supply channels.

10. The redox flow battery according to claim 1, wherein the cross-sectional surface area of the supply line is greater at least by a factor of 50 than a cross-sectional surface area of each of the supply channels.

11. The redox flow battery according to claim 1, wherein the cross-sectional surface area of the supply line is greater at least by a factor of 100 than a cross-sectional surface area of each of the supply channels.

12. The redox flow battery according to claim 1, wherein the supply channels are surrounded over their entire circumference by the cell frames.

13. The redox flow battery according to claim 1, wherein the plurality of cells are assembled to form a cell stack.

14. A redox flow battery comprising:
a plurality of half-cells, each half-cell comprising a cell frame defining a half-cell interior,
each half-cell being provided with a plurality of separate supply channels extending through the cell frame to supply electrolyte to the half-cell interior of the half-cell from a supply line provided outside of the cell frame, wherein each of the supply channels of the half-cells are unconnected to one another inside of the cell frames;
each half-cell being further provided with a plurality of separate disposal channels extending through the cell frame to remove electrolyte from the half-cell interior of the half-cell to a disposal line provided outside of the cell frame, wherein each of the disposal channels of the half-cells are unconnected to one another inside of the cell frames.

15. A method for operating a redox flow battery comprising a plurality of half-cells, each half-cell comprising a cell frame defining a half-cell interior, the method comprising:
supplying electrolyte to an interior of one of the half-cells via a plurality of separate supply channels extending through the cell frame from a supply line provided outside of the cell frame, the supply channels being unconnected to one another inside of the cell frames, and
removing electrolyte from the interior of the one of the half-cells via a plurality of separate disposal channels extending through the cell frame to a disposal line provided outside of the cell frame, the disposal channels being unconnected to one another inside of the cell frames.

16. The method according to claim 15, further comprising:
supplying electrolyte to an interior of a second one of the half-cells via a second plurality of separate supply channels extending through the cell frame from a second supply line provided outside of the cell frame, the second supply channels being unconnected to one another inside of the cell frames, and
removing electrolyte from the interior of the second one of the half-cells via a plurality of second disposal channels extending through the cell frame to a second disposal line provided outside of the cell frame, the second disposal channels being unconnected to one another inside of the cell frames.

17. The method according to claim 15, wherein the plurality of half-cells are assembled to form a cell stack.

18. The redox flow battery of claim 1, wherein the supply channels of each half-cell and/or the disposal channels of each half-cell are parallel to one another and to a plane of the half-cells.

* * * * *